July 12, 1960 G. R. PAUL ET AL 2,945,093
RANGE SELECTOR (TELEGRAPH SWITCHING)
Filed Feb. 21, 1957
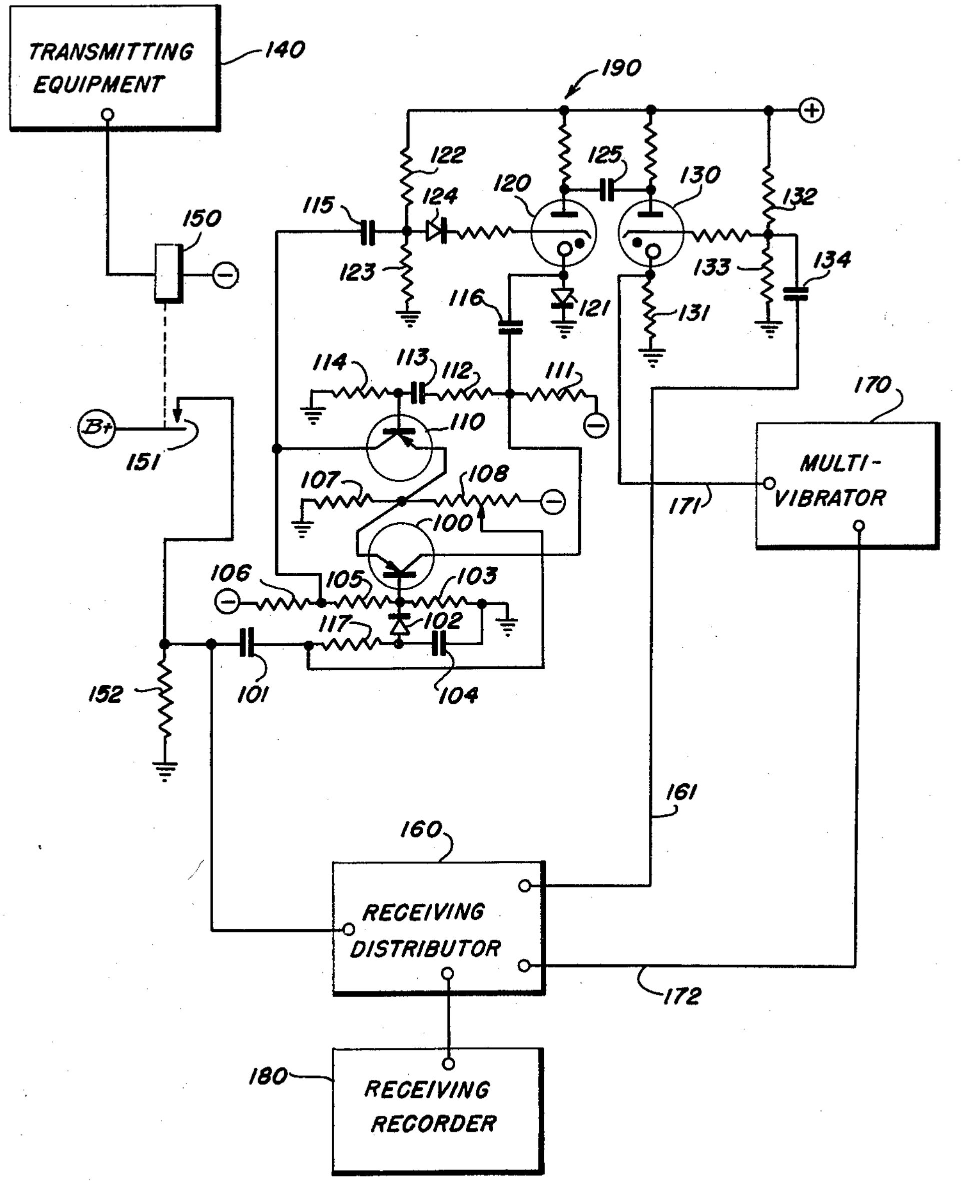
INVENTORS
CHARLES R. FISHER, JR.
GERALD R. PAUL
BY Francis E Blake
ATTORNEY United States Patent Office 2,945,093

Patented July 12, 1960

2,945,093

RANGE SELECTOR (TELEGRAPH SWITCHING)

Gerald R. Paul, Webster, and Charles R. Fisher, Jr., Rochester, N.Y., assignors to General Dynamics Corporation, Rochester, N.Y., a corporation of Delaware Filed Feb. 21, 1957, Ser. No. 641,745

9 Claims. (Cl. 178—53.1)

This invention relates to a data handling system, and, more particularly, to a range selector circuit.

In data transmitting and handling systems using plural bit permutation code signals in which the code bits are successively transmitted to a signaling channel, a data receiving distributor or commutator connected to the signaling channel successively distributes incoming signal bits to proper bit recording or storing elements in the order in which they are applied to the channel. To insure correct synchronous distribution of the intelligence code signal bits, these bits are generally preceded by a start or control signal which controls the starting of the receiving commutator or distributor. In systems using electronic distributors, the incoming code bits on the channel are sampled or detected during time intervals which are short compared to the overall duration of each of the code bits so that it is possible to sample each of the received bits at a time position therein which is delayed or displaced from the start of each code time period, thereby to avoid a response of the system or receiver to spurious short duration signals and to select a suitable portion of the received waveform for controlling the receiver.

Accordingly, one object of the present invention is to provide a new and improved range selector circuit.

Another object is to provide new and improved circuit means for selecting different portions of code signals for use by a receiving instrument.

Another object is to provide means for controlling the operation of a receiving distributor in accordance with received control signals.

A still further object involves the provision of a new and improved range selector circuit including a gated signal input.

A further object is the provision of a circuit including a pair of electronic switch means for controlling the operation of a receiving distributor.

In accordance with these and other objects, an embodiment of the present invention includes a receiving distributor to which are supplied successively transmitted code bits. The receiving distributor, which is operated step-by-step by a multivibrator or other suitable signal source, distributes the commonly received incoming code bits to a receiving instrument, such as a recorder or reperforator. In order to provide a means for delaying the response of the receiving distributor to the incoming code bits, a range selector circuit is provided including a first pair of electronic devices connected as a switch having two stable states and a second pair of electronic devices connected as a switch having a single stable state. The received control or start signals are applied to a time delayed gate circuit connected to the input of the second pair of electronic devices so that, following a suitable time delay, the second pair of electronic devices switches from its single stable state to an unstable state and, in doing so, operates the first pair of electronic devices from a first stable state to a second stable state in which the multivibrator is rendered effective to control step-by-step operation of the receiving distributor. At the end of each cycle of operation of the receiving distributor, a pulse is returned to the first pair of electronic devices to switch it to its first stable state in which the multivibrator is again rendered ineffective to control sequential operation of the receiving distributor. In this manner, the receiving distributor is rendered effective to sample each of the received intelligence code bits at a time position which is displaced from the beginning of the code time period by an interval equal to the delay interval interposed between the receipt of the start signal and the time at which the second pair of electronic devices is displaced from its single stable state.

Other objects and advantages of the present invention will become apparent from the ensuing description of an illustrative embodiment thereof in the course of which reference is made to the single sheet of drawings which illustrates the details of the range selector circuit of the present invention in conjunction with components of a portion of a data handling system which are shown in block diagram form.

Referring now more specifically to the drawings, therein is shown a portion of a data handling or telegraph transmission system which may be of any of the types well known in the art, but which preferably is of the type disclosed and described in detail in the copending application of Charles R. Fisher et al., Serial No. 634,973, filed January 18, 1957, which copending application is assigned to the same assignee as the present application. As shown in this copending application, data transmitting equipment 140 of a conventional type, which is either manually controlled or controlled by a record medium such as a perforated tape, transmits a plurality of intelligence code signal bits of a mark or space character preceded by a start pulse of a space character and followed by a stop pulse of a mark character to a receiving relay 150. The relay 150 closes a pair of contacts 151 in response to the receipt of a space signal condition and opens the contacts 151 in response to the receipt of a mark signal condition. The intermittent operation of the contacts 151 supplies a succession of mark and space signals to the input of a receiving distributor 160 by forwarding B+ potential thereto through the closed contacts 151 representing a spacing condition and by returning the input of the distributor 160 to ground through a resistance 152 to represent mark signaling conditions.

The receiving distributor 160, which includes a counting chain or ring of electronic devices, is operated step-by-step under the control of signals applied to a conductor 172 by a multivibrator 170. The step-by-step operation of the receiving distributor 160 sequentially renders a plurality of code bit storing or recording means in a receiving recorder 180 responsive to the instantaneous signaling condition provided at the input of the receiving distributor 160 under the control of the receiving relay 150. The multivibrator 170, which is normally ineffective to supply operating signals to the receiving distributor 160, is selectively rendered effective and ineffective under the control of a range selector circuit, indicated generally as 190, to which the multivibrator 170 is connected by a conductor 171.

In general, the range selector circuit 190 is responsive to the start space signal preceding each of the groups of received code bits and operates after an adjustable or selectable time delay following the receipt of the start signal to place the multivibrator 170 in operation so that the counting ring or chain in the receiving distributor 160 is advanced step-by-step to distribute the incoming code bits to the receiving recorder 180. As shown in the above identified copending Fisher et al. application, the distributor 160 is adapted to selectively render five magnetic transducing heads in the receiving recorder 180 responsive to the five code bits of a conventional Baudot code, although the distributor 160 and the recorder 180 could obviously be modified to accommodate permutation or combinational codes including different numbers of code bits. At the end of each cycle of operation of the receiving distributor 160, a signal is applied to a conductor 161 by the distributor for operating the range selector circuit 190 to render the multivibrator 170 ineffective to further advance the receiving distributor 160. The multivibrator 170 remains in this ineffective condition until the next start pulse is received by the relay 150.

Referring now more specifically to the range selector circuit 190, this circuit comprises a pair of transistors 100 and 110 connected as an electronic switch having a single stable state in which the transistor 100 is normally conducting and the transistor 110 is cut off. To maintain the transistor 100 normally conductive, a voltage divider including a plurality of resistances 103, 105, and 106 connected between negative battery of fifty volts and ground provides the base electrode of the transistor 100 with a somewhat negative potential. The emitter electrode of the transistor 100 is connected to a voltage divider including a pair of resistances 107 and 108 connected between negative battery and ground to be provided with a negative potential which is positive with respect to the base electrode of the transistor 100. These potentials maintain the transistor 100 normally conductive to provide a flow of base and collector current through the resistance 107 to supply a small negative potential which is connected to the emitter electrode of the transistor 110. The base electrode of the transistor 110 is connected to ground through a resistance 114 to normally maintain the base electrode of the transistor 110 positive with respect to the emitter electrode thereof so as normally to hold the transistor 110 in a cutoff condition.

When a space or start signal is applied to the receiving relay 150 to close the contacts 151, the connection of B+ potential to the resistor 152 provides a positive pulse which is coupled through a fairly large condenser 101, a series resistor 117, and a rectifier 102, after a suitable time delay, to the base electrode of the transistor 100, thereby driving the base electrode positive with respect to the emitter electrode and cutting off the transistor 100. Cutting off the transistor 100 decreases the flow of the collector current through the transistor 100 and a series resistor 111 to provide a positive pulse which is simultaneously coupled through a condenser 116 to the cathode of a gaseous discharge start tube 120 and through a series resistor 112 and a coupling condenser 113 to the base electrode of the transistor 110. The application of a negative potential to the base electrode of the transistor 110 renders this transistor conductive so that collector current flows through the resistor 106 to provide a positive pulse which is coupled through a condenser 115 and a rectifier 124 to the control electrode of the start tube 120. This control electrode is provided with a proper operating bias by a voltage divider including a pair of resistances 122 and 123 connected between a B+ potential of approximately 150 volts and ground.

The simultaneous application of the negative going potential to the cathode of the tube 120, which is blocked from ground by a suitably poled rectifier 121 in the cathode circuit, and the positive pulse to the control electrode of the start tube 120 renders this tube conductive so that a negative potential is applied by an anode coupling condenser 125 to the anode of a normally conductive stop tube 130. This negative voltage extinguishes the stop tube 130 to render the multivibrator 170 effective, thereby to initiate a cycle of recording operation of the receiving distributor 160 and of the receiving recorder 180.

More specifically, the stop tube 130 is normally in a conductive conduction and current flows through a cathode resistor 131 to provide a positive potential on the conductor 171. The positive bias on the conductor 171 biases a rectifier (not shown) in the multivibrator 170 in its forward direction to provide a conductive path over the conductor 171 for maintaining the multivibrator 170 ineffective. However, when the stop tube 130 is extinguished, as described above, ground potential is applied through the cathode resistor 131 to the conductor 171, thereby placing the multivibrator 170 in operation to deliver a series of time spaced pulses to the conductor 172.

These time spaced pulses operate the counting chain or ring in the receiving distributor 160 so that the following five code bits are selectively rendered effective to control the receiving recorder 180 as described in detail in the above identified copending Fisher et al. application. At the end of each cycle of operation of the receiving distributor 160, a positive going pulse is applied by the distributor 160 to the conductor 161, and this pulse is coupled through a condenser 134 to the control electrode of the stop tube 130. This control electrode is normally provided with an enabling potential by a voltage divider including a pair of resistances 132 and 133 connected between B+ potential and ground. Accordingly, the positive pulse provided at the end of the cycle of operation of the receiving distributor 160 renders the stop tube 130 conductive so as to couple a negative going potential through the anode coupling condenser 125 to the anode of the start tube 120, thereby extinguishing this tube. In addition, rendering the tube 130 conductive again provides a positive potential across the cathode resistor 131 to provide a conductive path on the conductor 171 to render the multivibrator 170 ineffective to drive the receiving distributor 160. The multivibrator 170 remains in this condition until such time as the next start pulse is applied to the range selector circuit 190.

Referring back to the range selection circuit 190, the positive potential provided across the resistor 106 in response to rendering the transistor 110 conductive momentarily increases the positive potential applied to the base electrode of the transistor 100 so as to aid in maintaining this transistor in a cutoff condition. After a time interval primarily determined by the time constant of the resistor 112 and the condenser 113, the negative potential applied to the base electrode of the transistor 110 becomes dissipated so that this transistor returns to a cutoff condition to reduce the potential drop across the resistor 106. The reduction of this potential drop together with the dissipation of the positive start pulse supplied through the condenser 101 again renders the base electrode of the transistor 100 negative with respect to the emitter electrode thereof so that the transistor 100 again begins to conduct.

It should be noted that although the transistor 100 can return to its conductive condition during the transmission of the code bits to the receiving distributor 160, some of which may include space signal conditions, the positive pulses supplied to the condenser 101 to operate the electronic switch including the transistors 100 and 110 does not affect the conductive conditions of the tubes 120 and 130 inasmuch as the tube 120 is now in a conductive condition and remains in this condition until such time as, at the completion of a cycle of operation of the receiving distributor 160, the stop tube 130 is again rendered conductive under the control of the distributor 160.

As set forth above, the range selector circuit 190 is utilized to provide a means for selecting a desired point in the duration of each of the code bits at which the receiving recorder 180 is to be rendered responsive to the signal supplied by the receiving relay 150. This selection is accomplished by providing a time delay between the application of the positive pulse to the condenser 101 and the time at which the base electrode of the transistor 100 is driven enough positive relative to its emitter to cut the transistor 100 off. To accomplish this, the resistor 108 is provided with an adjustable tap which is connected to one side of a condenser 104 through the series resistor 117, the other side of the condenser 104 being connected to ground. Accordingly, the condenser 104 is normally charged to a negative potential dependent upon the adjustment of the tap on the resistor 108 to provide a negative potential at one terminal of the rectifier 102. The other terminal of this rectifier is connected substantially to ground due to conduction in the emitter circuit of the transistor 100.

The coupling condenser 101 is of a relatively large magnitude so that the positive going potential provided by connecting positive battery to the resistor 152 is substantially instantaneously coupled to the condenser 104 to cause this condenser to charge in a positive direction or to discharge the negative potential thereon. After a time delay determined by the magnitude of the normal negative charge on the condenser 104, the terminal of the rectifier 102 connected thereto becomes positive with respect to the terminal of this rectifier which is connected to the base electrode of the transistor 100 and, at this time, the rectifier 102 conducts to drive this base electrode positive with respect to its emitter, thereby cutting off the transistor 100 as described above. The time delay between the application of the start pulse through the condenser 101 and the time at which the transistor 100 is rendered substantially nonconductive is adjusted by varying the position of the tap on the resistor 108. Moving the tap toward the battery connection serves to increase the time delay.

As set forth above, rendering the transistor 100 nonconductive and rendering the transistor 110 conductive fires the start tube 120 to extinguish the stop tube 130, thereby to initiate operation of the multivibrator 170. Since this multivibrator drives the counting chain in the receiving distributor 160 to render the bit storing or registering means in the receiving recorder 180 sequentially effective, the provision of an adjustable time delay between the positive going front of the start pulse and the starting of the multivibrator 170 permits these bit storage or recording means to be rendered responsive to only selected increments of the transmitted code bits at time positions which are displaced or delayed from the beginning of each of the code time periods.

Although the above described range selector circuit has been described in conjunction with a particular automatic data handling system, it should be understood that the general operational techniques and circuits embodied therein are capable of general application. Accordingly, it should be understood that many other modifications and embodiments may be devised by those skilled in the art which will fall within the spirit and scope of the principles of this invention.

What is claimed as new and desired to be secured by Letters Patent of the United States is:

1. A range selector circuit comprising a pair of electronic devices connected as a switch means having one stable state, one of said devices having a control electrode, means biasing said control electrode to maintain said one device in a normally conductive condition providing said one stable state, a unidirectional conducting device having one terminal connected to said control electrode and to said biasing means, a condenser connected to the other terminal of said unidirectional conducting device, condenser charging means for charging said condenser to a potential of a selected value, said condenser being charged by said condenser charging means to provide a potential difference across said unidirectional conducting device sufficient to block conduction therethrough, and a signal source for changing the potential to which said condenser is charged to render said unidirectional conducting device conductive so that a signal can be applied through said unidirectional conducting device to vary the conductive state of said one electronic device.

2. The range selector circuit set forth in claim 1 including circuit means controlled by the other of said electronic devices for returning said one electronic device to a conductive condition after a predetermined time interval.

3. A time delay circuit comprising an electronic switch including a first electronic device having one electrode and a second electronic device having two electrodes, a control device having at least two electrodes respectively connected to said one electrode of said first device and to one of said electrodes of said second device, a biasing network connected to the other of said electrodes of said second device for normally maintaining said second device in a selected conductive condition, a condenser charging circuit, means for applying a first potential to said condenser charging circuit, a unidirectional conducting device connected between said other electrode of said second device and said condenser charging circuit so that said first potential renders said unidirectional conducting device substantially nonconductive, and signaling means for applying a second potential to said condenser charging circuit to render said unidirectional conducting device conductive after a time delay determined by the value of said first potential, the rendering conductive of said unidirectional device causing the application of said second potential to said other electrode to vary the conductive states of said first and second electronic devices so that signals are transmitted to the two electrodes of said control device.

4. In a data processing system having a distributor operated by a signal source to distribute a code signal including a control signal, an electronic switch means having two stable states and including at least one electronic device having two control electrodes, said electronic switch means controlling said signal source in one stable state to render said signal source effective and in the other stable state to render the signal source ineffective, and means controlled by said control signals for simultaneously applying signals to both of said control electrodes to operate said electronic switch means to said one stable state.

5. The data processing system set forth in claim 4 including means controlled by said distributor for operating said electronic swtich means to said other stable state.

6. In a data processing system for use with plural bit code signals including a control signal, a distributor for distributing received bits of a code signal, a signal source for operating said distributor, a pair of gaseous discharge tubes connected as a first switch having two stable states, means connecting one of said gaseous discharge tubes to said signal source to control the operation of said source, a pair of transistors connected as a second switch having one stable state, means coupling both of said transistors to the other of said gaseous discharge tubes, a time delay circuit, normally closed gate means connected between said time delay circuit and one of said transistors, means for supplying said control signals to said time delay circuit so that said delay circuit opens said gate means after a predetermined delay, the opening of said gate means by said delay circuit passing the control signals to operate said one transistor and said other gaseous discharge tube to render said signal source effective to operate said distributor, and means controlled by said distributor for operating said one gaseous discharge tube at the end of a cycle of operation of said distributor.

7. The data processing system set forth in claim 6 including circuit means controlled by the other of said transistors for returning said one transistor to a normal condition after a selected time interval, the return of said one transistor to a normal condition having no effect on the stable states of said first switch means.

8. A range selector circuit comprising an electronic device having a control electrode, a signal source for controlling the operation of said electronic device, a potential responsive gate means connecting said source to said control electrode, a capacitor connected to said gate means for supplying different potentials for selectively opening and closing said gate means, a potential source connected to said capacitor for charging said capacitor in a first direction of polarity to a potential of a first value that closes said gate means to prevent the transfer of a signal from said signal source to said control electrode, and means for supplying a signal from said signal source to said capacitor to charge said capacitor in a direction of polarity opposite to said first direction of polarity to a potential that opens said gate means to pass a signal from said source of signals to said control electrode.

9. The range selector circuit set forth in claim 8 in which said potential source includes adjustable means for varying the first value of the potential supplied to said capacitor to control the time delay between the application of a signal to said gate means and the opening of said gate means.

References Cited in the file of this patent

UNITED STATES PATENTS

| | | |
|---|---|---|
| 2,673,936 | Harris | Mar. 30, 1954 |
| 2,732,428 | Dain et al. | Jan. 24, 1956 |
| 2,752,425 | Dain | June 26, 1956 |
| 2,854,590 | Wolfe | Sept. 30, 1958 |